(12) United States Patent
Matsuda

(10) Patent No.: US 8,732,336 B2
(45) Date of Patent: May 20, 2014

(54) INFORMATION DELIVERY SYSTEM, DISTRIBUTOR'S APPARATUS, RECIPIENT'S APPARATUS, AND COMPUTER-READABLE STORAGE MEDIUM

(75) Inventor: Araki Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 12/133,703

(22) Filed: Jun. 5, 2008

(65) Prior Publication Data

US 2008/0307033 A1 Dec. 11, 2008

(30) Foreign Application Priority Data

Jun. 8, 2007 (JP) ................................. 2007-153393

(51) Int. Cl.
*G06F 15/16* (2006.01)

(52) U.S. Cl.
USPC .......................................... 709/246; 709/201

(58) Field of Classification Search
USPC ................... 709/207, 208, 201, 246
See application file for complete search history.

(56) References Cited

U.S. PATENT DOCUMENTS

| 2003/0065665 A1* | 4/2003 | Kinjo .............................. 707/10 |
| 2003/0113657 A1* | 6/2003 | Nagahara et al. .......... 430/270.1 |
| 2006/0113957 A1* | 6/2006 | Ito et al. ........................ 320/114 |
| 2007/0106754 A1* | 5/2007 | Moore .......................... 709/217 |
| 2007/0168191 A1* | 7/2007 | Bodin et al. .................. 704/257 |
| 2010/0218083 A1* | 8/2010 | Tsujii et al. ................... 715/234 |

FOREIGN PATENT DOCUMENTS

| JP | 2000-179924 | 6/2000 |
| JP | 2004-179924 A | 6/2004 |
| JP | 2004-326683 | 11/2004 |
| JP | 2006-154262 A | 5/2006 |
| WO | WO2006137562 | * 12/2006 |

OTHER PUBLICATIONS

The above reference was cited in a Jan. 5, 2012 Japanese Office Action, which is enclosed without English Translation, that issued in Japanese Patent Application No. 2007-153393.

* cited by examiner

*Primary Examiner* — Haruner Rashid
(74) *Attorney, Agent, or Firm* — Cowan, Liebowitz & Latman, P.C.

(57) ABSTRACT

A distributor's apparatus generates distribution information including basic distribution information and extended distribution information which sets the correspondence between a plurality of output modes and a plurality of operating states of a predetermined application program in a recipient's apparatus and transmits the distribution information to the recipient's apparatus via a network. The recipient's apparatus receives the distribution information and detects the operating state of its own. The recipient's apparatus determines the output mode based on the detected operating state and the extended distribution information and outputs the distribution information in accordance with the determined output mode.

5 Claims, 8 Drawing Sheets

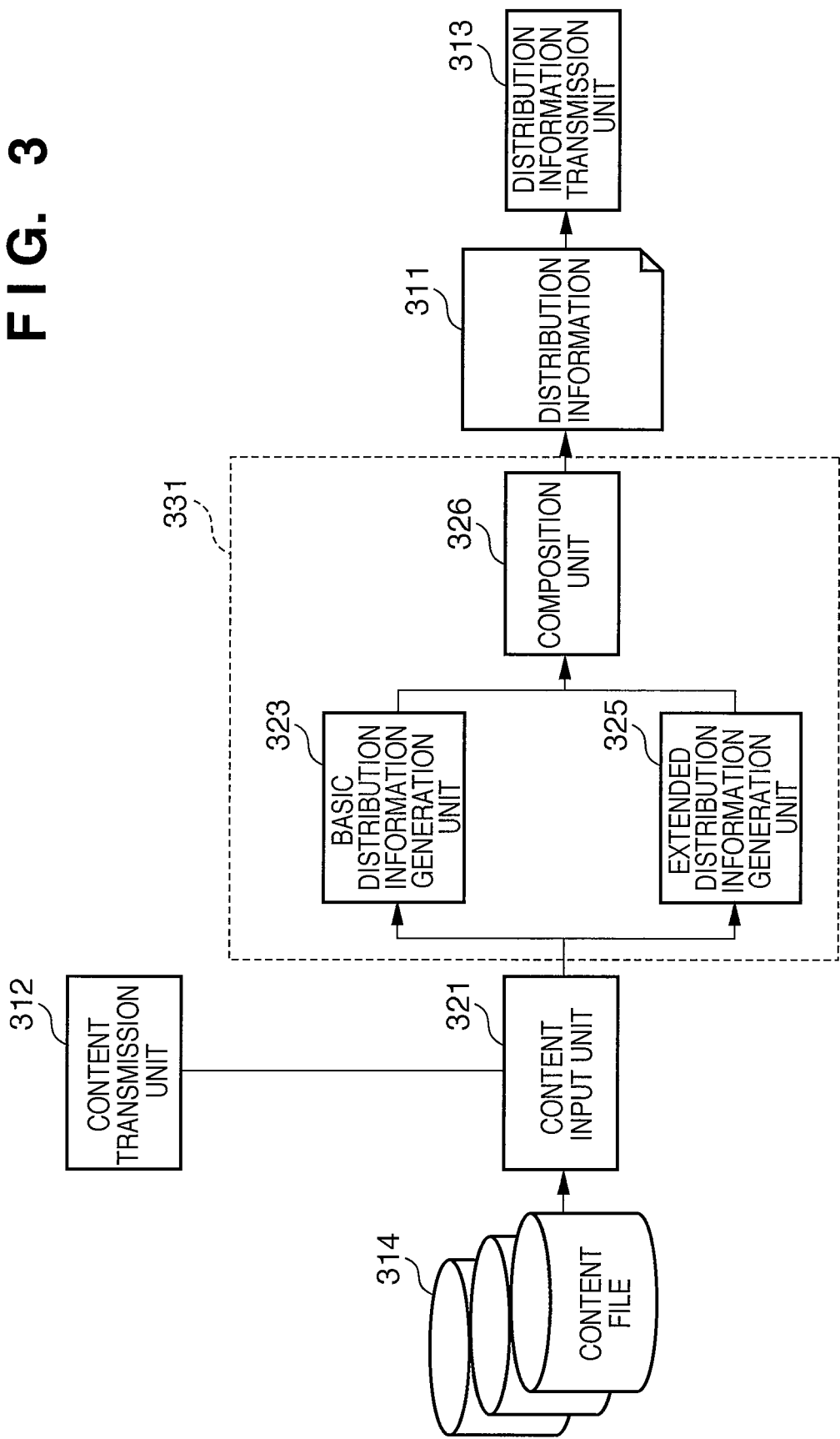

FIG. 4

| EXTENDED DISTRIBUTION INFORMATION | | | | |
|---|---|---|---|---|
| OPERATING STATE INFORMATION | | OUTPUT MODE INFORMATION | |
| WINDOW SIZE | VOLUME/MUTE | DISPLAY MODE | PLAYBACK MODE |
| ICON STATE | OFF | POP-UP WINDOW B | NOT OUTPUT |
| | ON | NOT OUTPUT | MESSAGE D |
| MINIMUM | OFF | WINDOW N | NOT OUTPUT |
| | ON | POP-UP WINDOW B | MESSAGE D |
| ... | ... | ... | ... |
| K×L ~ M×N PIXELS | OFF | WINDOW N | NOT OUTPUT |
| | ON | WINDOW N | MESSAGE D |
| MAXIMUM | OFF | WINDOW A | NOT OUTPUT |
| | ON | WINDOW X | MESSAGE C |

INFORMATION DELIVERY SYSTEM, DISTRIBUTOR'S APPARATUS, RECIPIENT'S APPARATUS, AND COMPUTER-READABLE STORAGE MEDIUM

BACKGROUND OF THE INVENTION

1. Field of the Invention

The present invention relates to an information delivery system, distributor's apparatus, recipient's apparatus, and computer-readable storage medium.

2. Description of the Related Art

Japanese Patent Laid-Open No. 2004-326683 discloses a technique of distributing multimedia contents such as a moving image signal and an audio signal. In the technique disclosed in Japanese Patent Laid-Open No. 2004-326683, a recipient's terminal receives, from a distributor, a request concerning the display mode of a content which should be distributed from the distributor's terminal to the recipient's terminal via a server and a network. This allows changing the content display mode in accordance with the recipient's desire even when the distributed content is the same.

The technique disclosed in Japanese Patent Laid-Open No. 2004-326683, however, requires the recipient to input a request to his/her terminal to change the content display mode. This may increase the workload on the recipient when browsing the content.

SUMMARY OF THE INVENTION

The present invention provides for outputting distribution information in an output mode which reflects the intention of a distributor and complies with the operating state of a recipient's apparatus without increasing the workload on the recipient's operation.

According to the first aspect of the present invention, there is provided an information delivery system including a distributor's apparatus and a recipient's apparatus, the distributor's apparatus comprising: setting unit configured to set extended distribution information representing a correspondence between a plurality of output modes of distribution information and a plurality of operating states of a predetermined application program in the recipient's apparatus; and transmission unit configured to transmit distribution information with the extended distribution information via a network, and the recipient's apparatus comprising: reception unit configured to automatically receive, via the network, the distribution information with the extended distribution information transmitted by the transmission unit; detection unit configured to detect the operating state of the predetermined application program in the recipient's apparatus when the reception unit has received the distribution information; determination unit configured to determine the output mode of the distribution information based on the extended distribution information and a result of detection by the detection unit; and output unit configured to output the distribution information in accordance with the output mode determined by the determination unit.

According to the second aspect of the present invention, there is provided a recipient's apparatus comprising: distribution information reception unit configured to automatically receive distribution information with extended distribution information via a network; detection unit configured to detect an operating state of a predetermined application program in the recipient's apparatus when the distribution information reception unit has received the distribution information; determination unit configured to determine an output mode of the distribution information based on the extended distribution information and a result of detection by the detection unit; and output unit configured to output the distribution information in accordance with the output mode determined by the determination unit.

According to the third aspect of the present invention, there is provided a distributor's apparatus comprising: setting unit configured to set extended distribution information representing a correspondence between a plurality of output modes of distribution information and a plurality of operating states of a predetermined application program in a recipient's apparatus; and transmission unit configured to transmit distribution information with the extended distribution information via a network, wherein the distribution information is output by the recipient's apparatus in accordance with the output mode determined based on the extended distribution information and the operating state of the predetermined application program in the recipient's apparatus when the recipient's apparatus has received the distribution information with the extended distribution information.

According to the fourth aspect of the present invention, there is provided a method executed by a recipient's apparatus, the method comprising steps of: automatically receiving distribution information with extended distribution information via a network; detecting an operating state of a predetermined application program in the recipient's apparatus upon receiving the distribution information; determining an output mode of the distribution information based on a result of detection and the extended distribution information; and outputting the distribution information in accordance with the determined output mode.

According to the fifth aspect of the present invention, there is provided a method executed by a distributor's apparatus, the method comprising steps of: setting extended distribution information representing a correspondence between a plurality of output modes of distribution information and a plurality of operating states of a predetermined application program in a recipient's apparatus; and transmitting distribution information with the extended distribution information via a network, wherein the distribution information is output by the recipient's apparatus in accordance with the output mode determined based on the extended distribution information and the operating state of the predetermined application program in the recipient's apparatus when the recipient's apparatus has received the distribution information.

According to the sixth aspect of the present invention, there is provided a computer-readable storage medium storing computer-readable instructions, the computer-readable instructions causing a recipient's apparatus to execute the method of the fourth aspect of the present invention.

According to the seventh aspect of the present invention, there is provided a computer-readable storage medium storing computer-readable instructions, the computer-readable instructions causing a distributor's apparatus to execute the method of the fifth aspect of the present invention.

According to the present invention, when causing a distributor's apparatus to generate information and distribute it to a recipient's apparatus, it is possible to output, to the recipient's apparatus, the information in an output mode which complies with the operating state of the recipient's apparatus and reflects the intention of the distributor without increasing the workload on the recipient.

Further features of the present invention will become apparent from the following description of exemplary embodiments with reference to the attached drawings.

BRIEF DESCRIPTION OF THE DRAWINGS

FIG. 3 is a block diagram showing an example of the arrangement of the content distribution apparatus according to the embodiment;

FIG. 4 is a table showing an example of the configuration of extended distribution information according to the embodiment;

DESCRIPTION OF THE EMBODIMENTS

Figure 1:
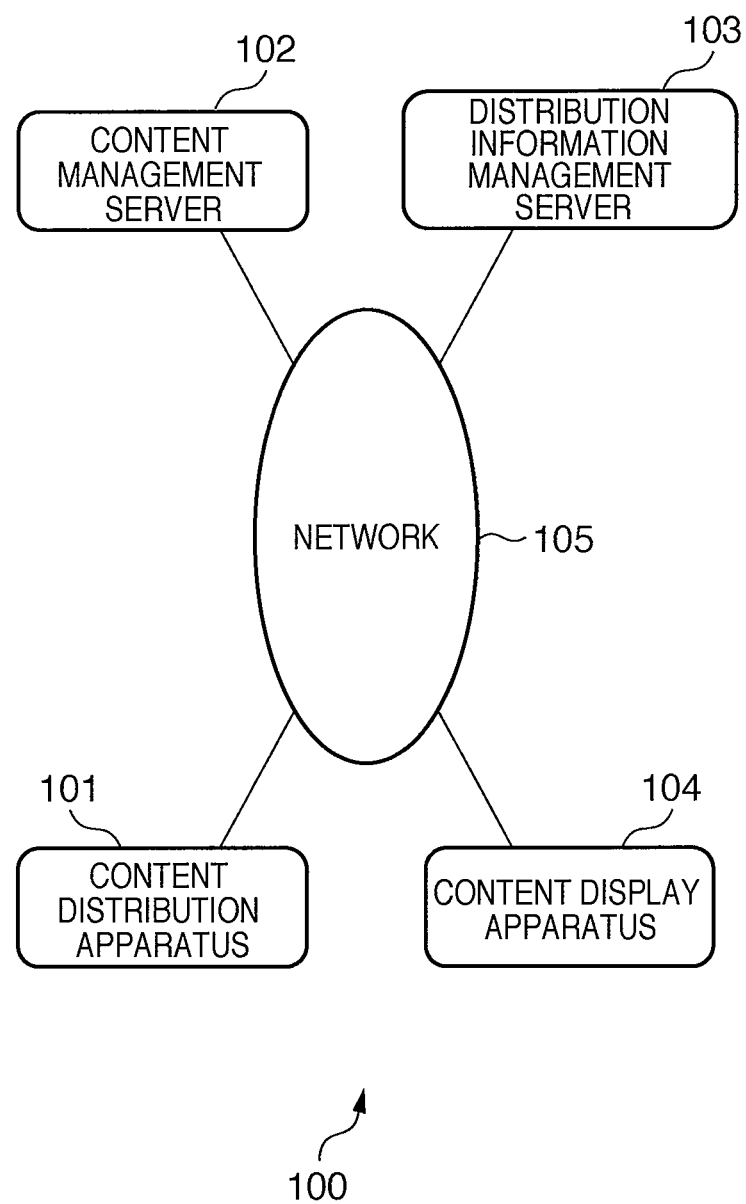
FIG. 1 is a block diagram showing an example of the arrangement of an information delivery system according to the embodiment.

An information delivery system 100 according to the embodiment will be described with reference to the block diagram in FIG. 1.

The information delivery system 100 includes a content distribution apparatus 101, content management server 102, distribution information management server 103, and content display apparatus 104.

Reference numeral 105 denotes a network. The network 105 is a communication network which communicably connects the content distribution apparatus 101, content display apparatus 104, distribution information management server 103, and content management server 102 to each other.

The content distribution apparatus 101 transmits a content file of a distribution target to the content management server 102 via the network 105. The content file contains moving image information, still image information, audio information, and text information, or multimedia information generated by combining them as needed.

The content distribution apparatus 101 also transmits generated distribution information to the distribution information management server 103. The distribution information corresponds to a content file and represents the attribute and distribution status of the content file. The distribution information will be described later in detail.

The content management server 102 receives and holds the content file from the content distribution apparatus 101 via the network 105. The content management server 102 also receives a request to transmit the content file from the content display apparatus 104 via the network 105 and, accordingly, transmits the content file to the content display apparatus 104 via the network 105.

The distribution information management server 103 receives and holds distribution information from the content distribution apparatus 101 via the network 105. The distribution information management server 103 also receives a request to transmit the distribution information from the content display apparatus 104 via the network 105 and, accordingly, transmits the distribution information to the content display apparatus 104 via the network 105.

In response to a recipient's input operation or the elapse of a predetermined time interval, the content display apparatus 104 transmits, to the distribution information management server 103 via the network 105, a request to transmit the distribution information. In response to the request, the content display apparatus 104 causes a distribution information reception unit to receive the distribution information from the distribution information management server 103 via the network 105. The content display apparatus 104 displays the distribution information on the display unit. The content display apparatus 104 can also cause a request transmission unit to transmit, to the content management server 102 via the network 105, a request to transmit a content file in accordance with the distribution information. In response to the request, the content display apparatus 104 receives the content file from the content management server 102 via the network 105.

A distribution information browsing program (to be referred to as an RSS reader program hereinafter) is installed in the content display apparatus 104. The RSS reader program is always running on the content display apparatus 104. As described above, the content display apparatus 104 accesses the distribution information management server 103 and acquires distribution information in accordance with the RSS reader program. The content display apparatus 104 displays an RSS reader program window and displays the acquired distribution information on the display unit. For a content file selected in accordance with the displayed distribution information, the content display apparatus 104 transmits an acquisition request to the content management server and downloads the content file. The content display apparatus 104 can display the content file on the display unit using either the RSS reader program or another application program such as a Web browser.

It should be noted that, although the RSS reader program will be exemplified in this embodiment, the present invention can also be implemented by another viewer or browser program.

Figure 2:
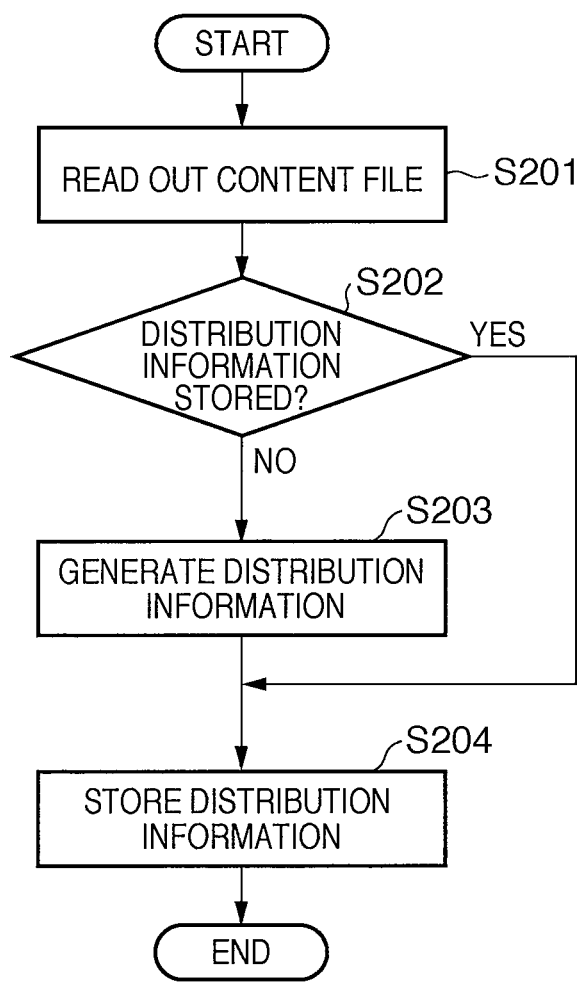
FIG. 2 is a flowchart illustrating an example of a process of causing a content distribution apparatus according to the embodiment to generate distribution information.

The sequence of a process of causing the content distribution apparatus 101 to generate distribution information will be described next with reference to the flowchart in FIG. 2 and the block diagram in FIG. 3. FIG. 2 is a flowchart illustrating the sequence of a process of causing the content distribution apparatus 101 to acquire a content file and generate distribution information corresponding to it. FIG. 3 is a block diagram showing the arrangement of the content distribution apparatus 101. A distribution information creation program and an OS are installed in the content distribution apparatus 101. A CPU executes the program codes, thereby implementing the following procedure.

A distributor acquires an analog image signal by capturing an image of an object using an image capturing apparatus. The image capturing apparatus generates a digital image signal by A/D-converting the analog image signal. The digital image signal undergoes image processing to generate image data. The image capturing apparatus supplies the image data to the content distribution apparatus 101 via a communication I/F. The image data is supplied as a content file together with its shooting information. In this embodiment, a content file has the EXIF format and contains image data and shooting information. The shooting information contains a shooting date, file name, tag, and the like. The content file supplied to the content distribution apparatus 101 is stored in a storage unit 314. The content distribution apparatus 101 causes a content transmission unit 312 to upload the content file to the content management server 102 via the network 105. The content management server 102 issues content identification information for the uploaded content file and notifies the content distribution apparatus 101 of the content identification information. The content distribution apparatus 101 stores the content identification information in the storage unit 314 in association with the content file.

Distribution information generation by the content distribution apparatus 101, which will be described with reference to FIG. 2, can start either when a new content file is stored in the storage unit 314 or periodically at a predetermined interval.

In step S201, the content distribution apparatus 101 causes a content input unit 321 to read out a content file from the storage unit 314 and input it to a distribution information generation unit 331.

In step S202, the content distribution apparatus 101 refers to the storage unit 314 and determines, based on the content identification information of the content file input in step S201, whether distribution information already exists. If the content distribution apparatus 101 determines that distribution information already exists, the process advances to step S204. Otherwise, the process advances to step S203.

In step S203, the content distribution apparatus 101 causes the distribution information generation unit 331 to generate distribution information 311. The distribution information generation unit 331 includes a basic distribution information generation unit 323, extended distribution information generation unit 325, and composition unit 326.

In this embodiment, the distribution information 311 is a file having the RSS (Really Simple Syndication) 2.0 format described in the XML (extensible Markup Language). The distribution information 311 contains basic distribution information formed from elements defined by the standard specifications of RSS 2.0, and extended distribution information formed from elements defined in a unique name space. This embodiment will be described assuming that the basic distribution information complies with the standard specifications of RSS 2.0.

It should be noted that, although a file having the RSS 2.0 format will be exemplified in this embodiment, the present invention is not limited to this and can also be implemented by a file having another format.

First, the content distribution apparatus 101 causes the basic distribution information generation unit 323 to generate basic distribution information to be output to the content display apparatus 104.

More specifically, in response to a distributor's operation, the content distribution apparatus 101 inputs text information representing the title of the distribution information, the path (e.g., URL) to the content management server 102, explanation message, and the like and causes the basic distribution information generation unit 323 to describe them in basic distribution information. The content distribution apparatus 101 also acquires a content file and its content identification information from the storage unit 314. The content distribution apparatus 101 also acquires shooting information, file name, file size, and thumbnail image data from the content file. The content distribution apparatus 101 causes the basic distribution information generation unit 323 to describe the content identification information, the identification information of the thumbnail image data (thumbnail identification information), the file name, and the like in the basic distribution information as items. The content distribution apparatus 101 transmits the thumbnail image data to the distribution information management server 103 together with the distribution information. The content display apparatus 104 receives the thumbnail image data together with the distribution information. The content display apparatus 104 reads out thumbnail image data corresponding to thumbnail identification information and causes the display unit to display it, as needed, in accordance with the description of basic distribution information and extended distribution information (to be described later).

In this way, the content distribution apparatus 101 generates basic distribution information.

Next, the content distribution apparatus 101 causes the extended distribution information generation unit 325 to generate extended distribution information to update the output mode of the text and thumbnail image data designated by the basic distribution information so as to correspond to the operating state of the content display apparatus 104.

First, the content distribution apparatus 101 acquires output mode information in response to a distributor's operation. The output mode information sets the display layout of the text and thumbnail image data, including the types, positions, and font sizes of display items, the font colors, the font types, the window type, and the color of window background. Examples of the types of display items are a file name and thumbnail image data designated by the basic distribution information. The file name may be displayed while being linked with the content identification information.

In response to a distributor's operation, the content distribution apparatus 101 acquires audio files of an explanation message, alarm, music, and the like and causes the extended distribution information generation unit 325 to describe the identification information (audio identification information) of the audio files in the extended distribution information. The content distribution apparatus 101 acquires playback mode information. The playback mode information sets the playback format including the types of audio files to be played back, and the playback order, volume, pause, alarm, and playback timings of the audio files.

The content distribution apparatus 101 transmits the audio files to the distribution information management server 103 together with the distribution information, like the above-described thumbnail image data. The content display apparatus 104 receives the audio files together with the distribution information. The content display apparatus 104 reads out an audio file corresponding to audio identification information and causes an audio playback unit to play it back, as needed, in accordance with the description of extended distribution information.

In this case, a plurality of kinds of output mode information (display mode information and playback mode information) are generated. Output mode information may be either shared by different pieces of distribution information or uniquely generated for each distribution information.

Operating state information contains the window size of the RSS reader program displayed on the display unit of the content display apparatus 104 and a mute state set in the audio playback unit. It should be noted that the volume state in the audio playback unit can be set on the RSS reader program.

Note that the active state of the window of a program other than the RSS reader program may be detected. For example, when full-screen display of the window of another program is detected, or the user is performing an input operation in the window of another program, it is necessary to output distribution information without obstructing the display.

Next, the content distribution apparatus 101 causes the extended distribution information generation unit 325 to set the display mode information and playback mode information in correspondence with the operating state information, thereby generating extended distribution information.

Figure 6:
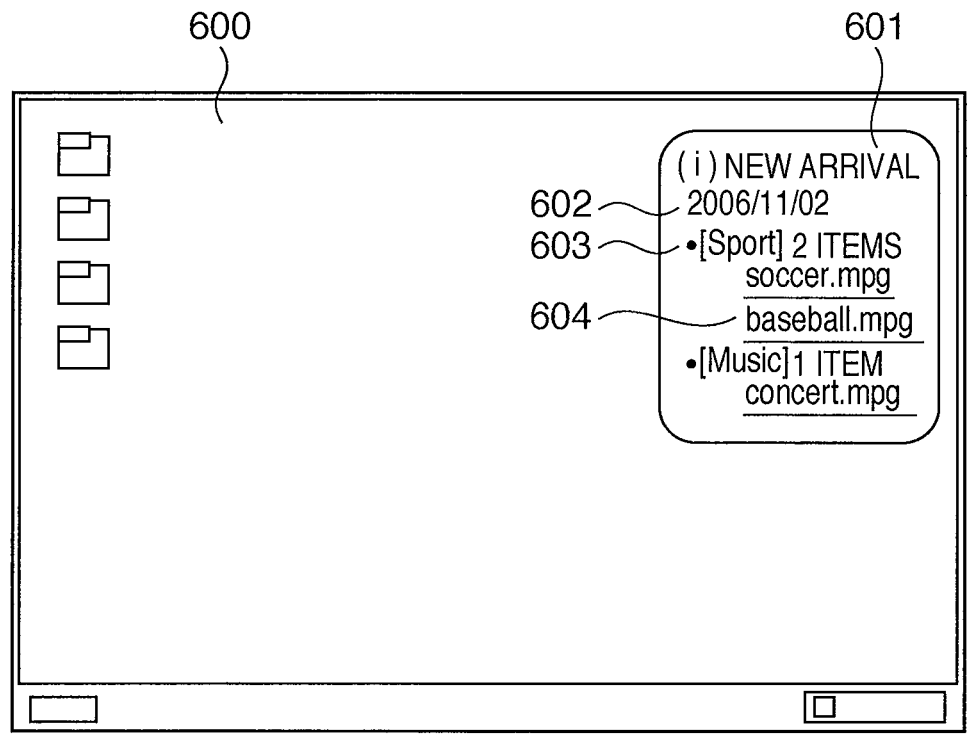
FIG. 6 is a view showing an example of a distribution information screen displayed on the content display apparatus according to the embodiment.

FIG. 4 shows an example of the correspondence between operating state information and output mode information. For example, "pop-up window B" indicates a display mode to display a distribution date 602, tag 603, and file names 604 in a pop-up window 601 on a desktop 600 of the display unit of the content display apparatus 104, as shown in FIG. 6. Each file name 604 is linked with the content identification information of a content file and a path to the content management server 102.

Figure 7:
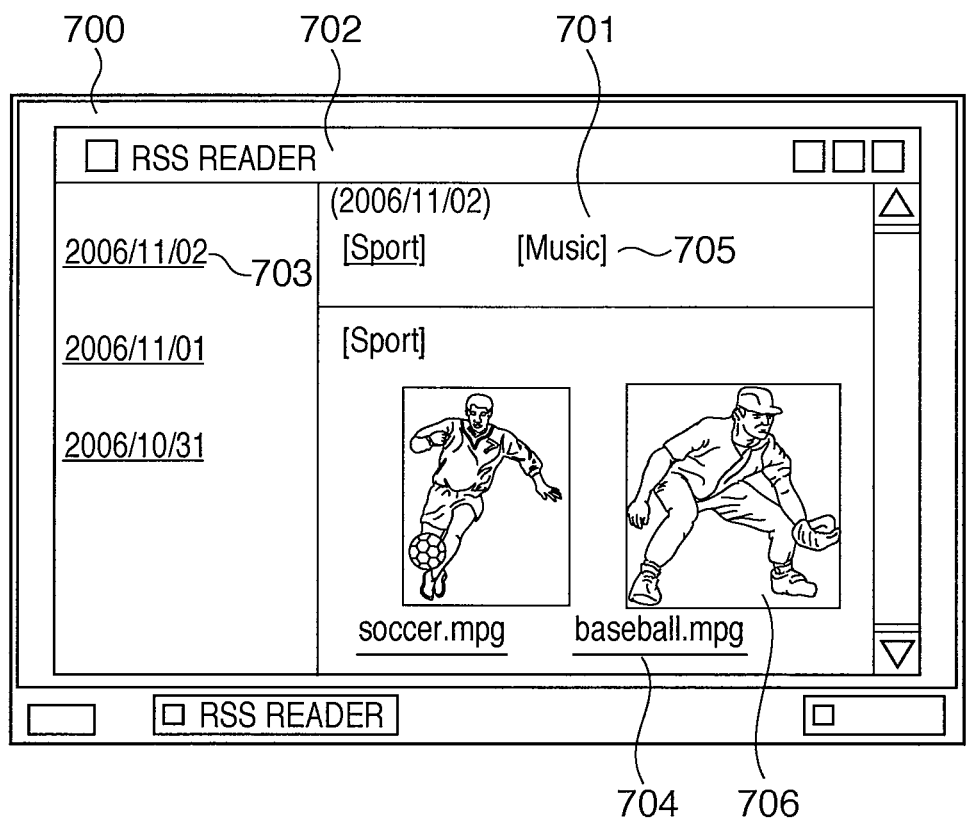
FIG. 7 is a view showing another example of the distribution information screen displayed on the content display apparatus according to the embodiment.

For example, "window N" indicates a display mode to display a distribution date list 703, tags 705, file names 704, and thumbnail images 706 in a window 702 on a desktop 700 of the display unit of the content display apparatus 104, as shown in FIG. 7. Information contained in the distribution information of the distribution date selected from the distribution date list 703 is displayed in an area 701.

In the table shown in FIG. 4, only a name is stored for each output mode information. The entity of the display mode information or playback mode information is separately stored in the storage unit 314. The display mode information or playback mode information is read out based on the name and transmitted together with the distribution information, as needed.

It should be noted that the extended distribution information may be generated by further associating the shooting information of a content file with output mode information or operating state information.

The content distribution apparatus 101 finally causes the composition unit 326 to combine the basic distribution information with the extended distribution information, thereby generating the distribution information 311.

In step S204, the content distribution apparatus 101 stores the distribution information generated in step S203 in the storage unit 314.

The content distribution apparatus 101 causes a distribution information transmission unit 313 to transmit the thus generated distribution information to the distribution information management server 103 via the network 105.

When the distributor designates the output mode of distribution information in the above-described manner, the distribution information can be output to the recipient's apparatus in the output mode complying with the distributor's intention. Additionally, since the output mode of the distribution information is determined in consideration of the operating state of the recipient's apparatus, the recipient can browse the distribution information in an appropriate state without any cumbersome operation.

It should be noted that, although an image capturing apparatus supplies a content file to the content distribution apparatus 101, and the content distribution apparatus 101 generates distribution information in this embodiment, the present invention is not limited to this. The above-described content distribution apparatus 101 may incorporate the image capturing apparatus and execute the operation. This arrangement saves the recipient a trouble of, for example, supplying the content file from the image capturing apparatus to the content distribution apparatus 101 and reduces the workload in the operation.

Figure 5:
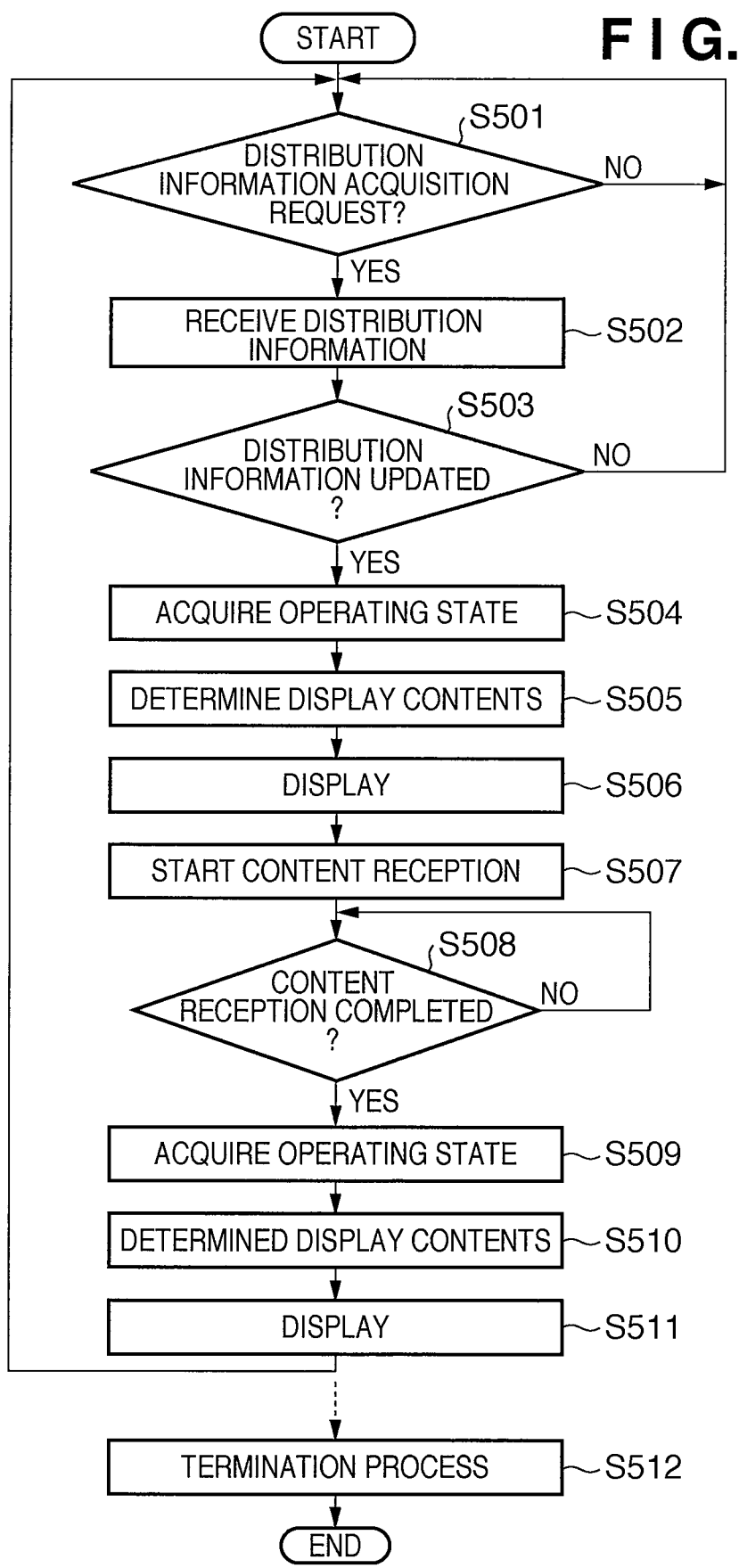
FIG. 5 is a flowchart illustrating an example of a process of causing a content display apparatus according to the embodiment to display distribution information.
Figure 8:
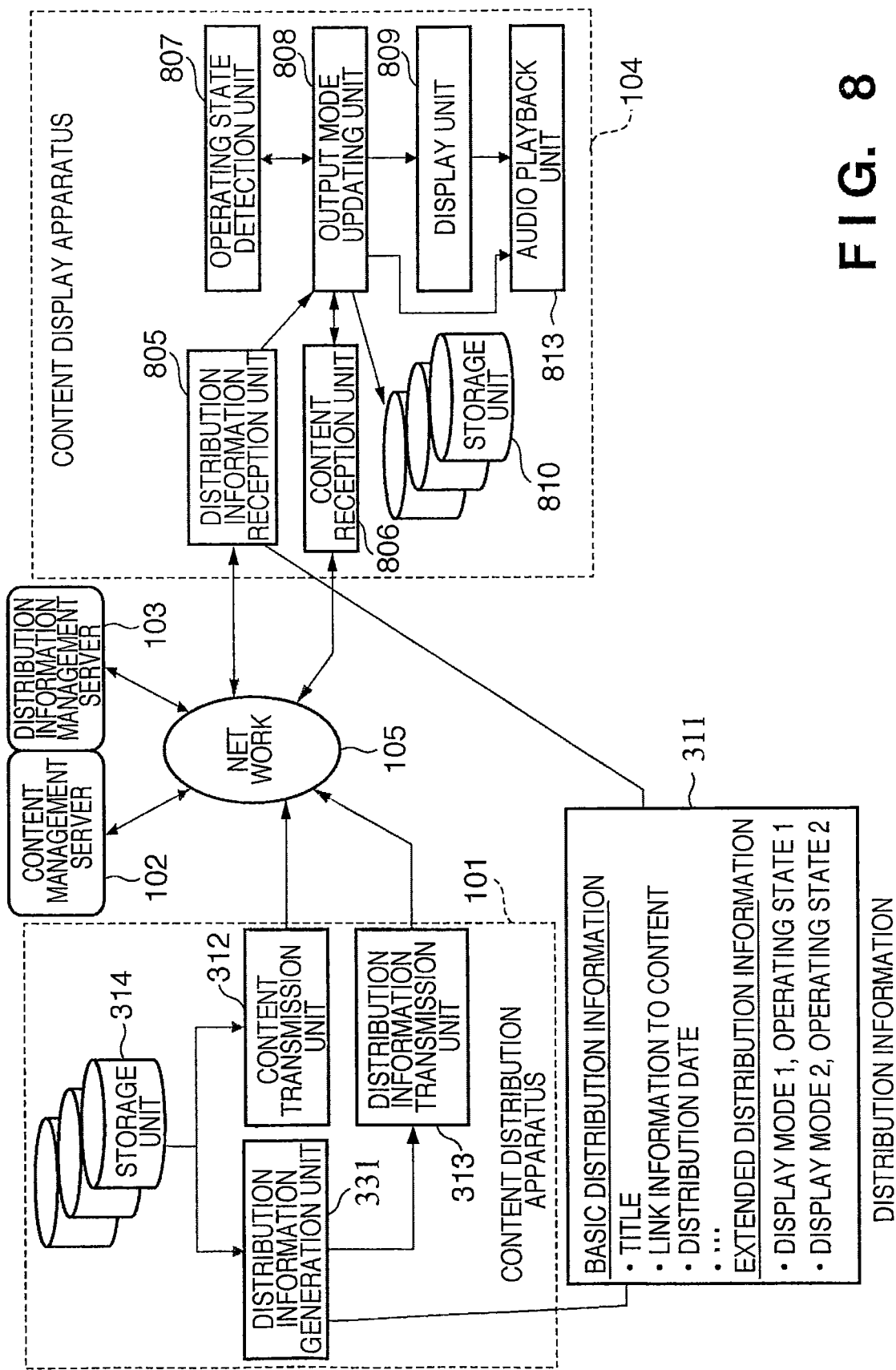
FIG. 8 is a block diagram showing an example of the arrangement of an information delivery system according to the embodiment.

The sequence of a process of causing the content display apparatus 104 to display distribution information in accordance with the RSS reader program will be described next with reference to the flowchart in FIG. 5 and the block diagram in FIG. 8.

In this embodiment, the content display apparatus 104 automatically activates the RSS reader program at the time of power-on. After activating the RSS reader program, the content display apparatus 104 displays, on a display unit 809, a standby state represented by, for example, an icon resident on a task bar. After that, the content display apparatus 104 displays the window of the RSS reader program on the display unit 809 in response to an instruction input by the recipient by, for example, clicking on the icon. Additionally, the window display size changes in response to an instruction input when the recipient, for example, drags the window or clicks on a predetermined icon on the window.

In step S501, the content display apparatus 104 determines whether a distribution information acquisition request is accepted. For example, the content display apparatus 104 generates the distribution information acquisition request upon accepting a recipient's input operation. Alternatively, the distribution information acquisition request automatically occurs when a predetermined time interval has elapsed. The distribution information acquisition request includes a path (e.g., URL) to the distribution information management server 103. The path to the distribution information management server 103 may be set either in the RSS reader program in advance or in response to a recipient's input operation.

The predetermined time interval is set in the RSS reader program in advance by previously received distribution information without designation by the recipient. When the recipient designates the predetermined time interval, it may preferentially be applied.

Upon determining in step S501 that the distribution information acquisition request is generated, the content display apparatus 104 advances the process to step S502. Otherwise, the process returns to step S501.

In step S502, the content display apparatus 104 requests distribution information of the distribution information management server 103 via the network 105 based on the distribution information acquisition request. A distribution information reception unit 805 of the content display apparatus 104 receives distribution information from the distribution information management server 103 in response to the request via the network 105. That is, when the predetermined time interval has elapsed, and the distribution information acquisition request has automatically occurred in step S501, the content display apparatus 104 transmits the request to the distribution information management server 103 and the distribution information reception unit 805 automatically receives the distribution information.

In step S503, the content display apparatus 104 acquires already received distribution information by referring to a storage unit 810. The distribution information received in step S502 is compared with the already received distribution information to determine whether the distribution information is updated. Upon determining that the distribution information is updated, the content display apparatus 104 advances the process to step S504. Otherwise, the process returns to step S501.

In step S504, the content display apparatus 104 causes an operating state detection unit 807 to detect the operating states of the display unit 809 and an audio playback unit 813, thereby acquiring operating state detection information. First, the content display apparatus 104 causes the operating state detection unit 807 to detect the display state of the RSS reader program. For example, the presence/absence of the window of the RSS reader program displayed on the display unit 809, the window size, and the presence/absence of an icon displayed on the task bar are detected as the display state. The RSS reader program itself manages the display state of its window (e.g., the above-described ON/OFF of display or the size and display position of the displayed window). The operating state detection unit 807 refers to the display state as needed and acquires it as a detection result. The content display apparatus 104 also causes the operating state detection unit 807 to detect whether the volume of the audio playback unit 813 of the content display apparatus 104 is set to mute. Like the window, the volume setting is also managed by the RSS reader program.

In step S505, the content display apparatus 104 causes an output mode updating unit 808 to determine the distribution information output mode based on the extended distribution information of the distribution information and the operating state detection information.

In step S506, the content display apparatus 104 causes the display unit 809 and the audio playback unit 813 to display or play back file names, thumbnail image data, and the like in the output mode determined in step S505 based on the distribution information.

In step S507, the content display apparatus 104 selects a download target content file in response to an operation of a recipient who has browsed the distribution information. In this embodiment, the file name of a content file which is contained in the distribution information and displayed on the display unit 809 is linked with content identification information and a path to the content management server 102. Hence, when the recipient selects and designates a file name displayed on the window of the RSS reader program, the content display apparatus 104 acquires content identification information and a path to the content management server 102 corresponding to the file name.

The content display apparatus 104 generates a request to transmit including the content identification information and transmits it to the content management server 102 via a communication interface and the network 105. The content display apparatus 104 causes a content reception unit 806 to receive a content file and its data size information, which are transmitted from the content management server 102 in response to the request to transmit the content file, via the network 105. The data size information of the content file is temporarily stored in a memory (not shown) of the content display apparatus 104.

In step S508, the content display apparatus 104 compares the data size information of the content file stored in the memory with the data size of the content file received by the content reception unit 806. With this process, the content display apparatus 104 determines whether the content file reception is completed. More specifically, if the data size of the content file received by the content reception unit 806 is smaller than the data size of the content file stored in the memory, the content display apparatus 104 determines that reception is still progressing and has not ended yet. Upon determining in step S508 that the content file reception is completed, the content display apparatus 104 advances the process to step S509. Otherwise, step S508 is repeated.

In step S509, the content display apparatus 104 causes the operating state detection unit 807 to detect the operating state of the content reception unit 806, thereby acquiring operating state detection information.

More specifically, the content display apparatus 104 causes the operating state detection unit 807 to read out the data size of the entire content file from the memory and receives the data size of the already received part of the content file from the content reception unit 806. The operating state detection unit 807 calculates the progress status of the content file reception based on these data sizes. The content display apparatus 104 causes the operating state detection unit 807 to acquire the calculation result as the operating state detection information of the content reception unit 806. For example, when the data size of the entire content file is 1 MB, and the data size of the received part of the content file is 0.5 MB, the progress status is calculated as 50%.

Alternatively, the content display apparatus 104 causes the operating state detection unit 807 to read out the end time of the content file reception by the content reception unit 806 from the memory and calculate the elapsed time. The content display apparatus 104 causes the operating state detection unit 807 to acquire the calculation result as the operating state detection information of the content reception unit 806.

In step S510, the content display apparatus 104 causes the output mode updating unit 808 to determine the distribution information output mode based on the extended distribution information and the operating state detection information.

In step S511, the content display apparatus 104 causes the display unit 809 and the audio playback unit 813 to display or play back file names, thumbnail image data, and the like in the output mode determined in step S510 based on the distribution information.

It should be noted that the determination process of step S508 can be skipped. In this case, for example, when the operating state detection information indicates that the content file reception by the content reception unit 806 is still progressing, the file name is displayed in a color (e.g., gray) representing that the reception is progressing. On the other hand, when the operating state detection information indicates completion of the content file reception by the content reception unit 806, the file name is displayed in a color (e.g., black) representing completion of reception.

Alternatively, if the operating state detection information indicates that only a short time has elapsed from the end of reception by the content reception unit 806, the file name is displayed in a color (e.g., blue) representing that the elapsed time is short. On the other hand, if the operating state detection information indicates that a long time has elapsed from the end of reception by the content reception unit 806, the file name is displayed in a color (e.g., red) representing that the elapsed time is long. The file name displayed in a color corresponding to the elapsed time can call the recipient's attention and prompt him/her to quickly view the content file. The length of the elapsed time is determined based on the time preset in the RSS reader program.

It should be noted that, instead of changing the display color of the file name, a mark may be added in accordance with the operating state of the content reception unit 806. As the operating state of the content reception unit 806, the communication status (communication speed or disconnection status) with the network 105 may be detected.

In step S512, the content display apparatus 104 finishes the process. When the content display apparatus 104 detects input of a process end instruction in one of steps S501 to S511 in response to a recipient's operation, the process may advance to step S512 to finish the process.

The operating state detection unit 807 executes the above-described detection by acquiring the operating state of the RSS reader program in the display unit 809 or the audio playback unit 813.

In the above-described embodiment, the content display apparatus 104 selects the download target content file in step S507 in response to the recipient's manual operation. Instead, the content display apparatus 104 may automatically select all content files or automatically select a content file in accordance with a predetermined condition. The content display apparatus may switch between content file selection in response to the manual operation and automatic content file selection in accordance with the operating state of the RSS reader program. For example, when the window of the RSS reader program is displayed on the display unit 809 in a full-screen mode, a content file is selected in response to the manual operation. On the other hand, when the RSS reader program is displayed on the display unit 809 as an icon in the task bar, a content file is automatically selected. Alternatively, the content display apparatus may switch between automatic content file selection and content file selection in response to the manual operation in accordance with the sizes of individual content files or the sum of the sizes of the content files. Whether to execute automatic content file selection or content file selection in response to the manual operation and the switching condition as described above may be described in extended distribution information so that the content display apparatus 104 operates in accordance with the information.

As described above, when the recipient's apparatus automatically displays distribution information in an output mode complying with its operating state, the recipient can browse the distribution information in the appropriate output mode without any workload on the operation. Additionally, the distributor can display distribution information in an output mode complying with the operating state of the recipient's apparatus in accordance with his/her intention.

Figure 9:
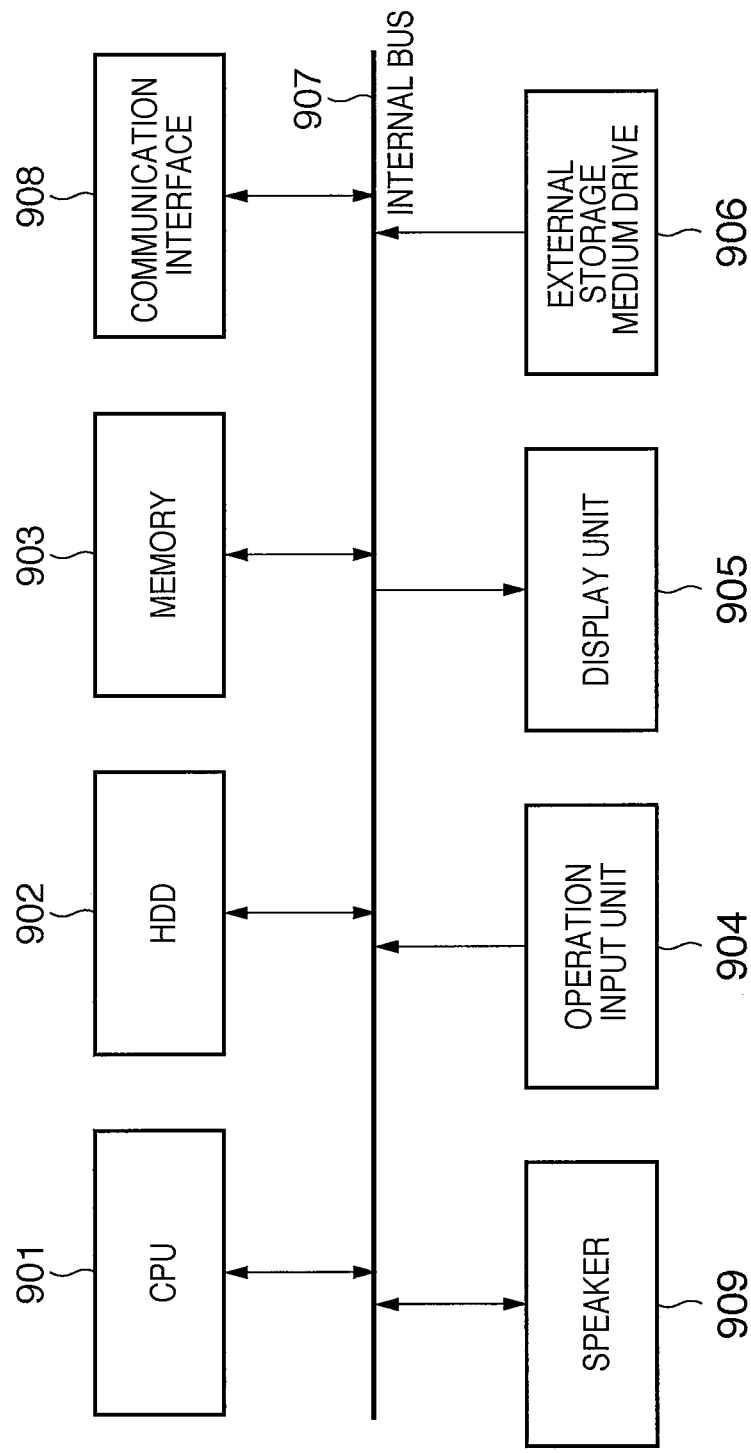
FIG. 9 is a block diagram showing an example of the arrangement of each of the content distribution apparatus, content display apparatus, content management server, and distribution information management server.

The hardware configuration of each of the content distribution apparatus 101, content display apparatus 104, content management server 102, and distribution information management server 103 will be described next with reference to FIG. 9. Each of the content distribution apparatus 101, content display apparatus 104, content management server 102, and distribution information management server 103 is implemented by, for example, a computer apparatus.

An arithmetic processing unit (CPU) 901 controls the process operation.

A hard disk drive (to be referred to as an HDD hereinafter) 902 records digital content files such as encoded image signals and the program codes of execution programs for various kinds of processes in a readable format. In this embodiment, the HDD 902 also stores the OS and the program codes of the RSS reader program, content file creation program, and distribution information creation program. The CPU 901 operates in accordance with the OS or various kinds of program codes, thereby implementing the functions of the content distribution apparatus 101, content display apparatus 104, content management server, and distribution information management server of the above-described embodiment.

Reference numeral 903 denotes a memory. The memory 903 serves as a work area where program codes or content files recorded in the HDD 902 are loaded, and the CPU 901 executes various kinds of processes.

An operation input unit 904 includes, for example, a keyboard and a pointing device. The CPU 901 detects input to the operation input unit 904 in response to a user's operation and executes various kinds of processes in accordance with the instruction to the execution program loaded in the memory 903.

A display (display unit) 905 is formed from, for example, a CRT display or a liquid crystal display. The display unit 905 of the content display apparatus 104 displays distribution information or a content file, as described above.

An external storage medium drive (storage unit) 906 read-accesses an external storage medium such as a CD-ROM or a DVD-ROM. The embodiment can be implemented even when not the HDD 902 but an external storage medium connected to the external storage medium drive 906 stores the program codes of the above-described various programs.

Reference numeral 908 denotes a communication interface. The communication interface 908 serves as an interface when transmitting or receiving various kinds of data such as distribution information or a content file via the network 105.

A speaker (audio playback unit) 909 plays back audio data.

The above-described constituent elements are connected via an internal bus 907 to be communicable with each other via the internal bus 907.

A program for implementing the functions of the above-described embodiment will be described next.

To implement the function of the above-described embodiment, various kinds of devices are operated. Software program codes (program) to implement the functions of the above-described embodiment are supplied to a computer in an apparatus or a system connected to the various kinds of devices.

An arrangement for causing the various kinds of devices to operate in accordance with the program stored (as software or hardware) in the computer (CPU or MPU) of the system or apparatus is also incorporated in the present invention.

In this case, the software program itself implements the functions of the above-described embodiment.

The program itself, and a unit for supplying the program codes of the program to the computer, and for example, a storage medium which stores the program are also incorporated in the present invention.

Examples of the storage medium to store the program are a floppy (Japanese registered trademark) disk, hard disk, optical disk, magneto optical disk, CD-ROM, magnetic tape, nonvolatile memory card, and ROM.

The functions of the above-described embodiment are implemented not only when the computer executes the supplied program.

For example, when the program implements the functions of the above-described embodiment in cooperation with the OS (Operating System) or another application running on the computer, the program is incorporated in the present invention.

The supplied program is stored in the memory of a function expansion board of the computer or a function expansion unit connected to the computer.

When the CPU of the function expansion board or function expansion unit partially or wholly executes actual processing based on the instructions of the program to implement the functions of the above-described embodiment, the program is incorporated in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-153393, filed Jun. 8, 2007 which is hereby incorporated by reference herein in its entirety.

What is claimed is:

1. An information processing system including a distributor's apparatus and a recipient's apparatus on a network,
the recipient's apparatus comprising:
a display control unit, when a predetermined program is activated, displaying a window of the predetermined program on a display unit using one of a plurality of display forms;
a request unit, when the predetermined program is being activated, automatically requesting the distributor's apparatus to transmit basic distribution information;
a reception unit receiving the requested basic distribution information, extended distribution information that corresponds to the requested basic distribution information, and audio information from a distributor's apparatus via the network, the extended distribution information including a display arrangement pattern of the basic distribution information per respective one of the plurality of display forms of the window of the predetermined program and playback mode information representing a playback mode of the audio information per respective one of volume settings and the detected state of volume setting;

a detection unit detecting the display form of the window of the predetermined program displayed by the display control unit and a state of volume setting, when the basic distribution information to be displayed on the display unit is received by the reception unit; and an output control unit displaying the basic distribution information on the display unit using the display arrangement pattern that is determined based on the extended distribution information and the detected display form and to playback the audio information based on the extended distribution information, and the distributor's apparatus comprising:

a setting unit setting the display arrangement pattern of the basic distribution information per respective one of the plurality of display forms of the window of the predetermined program and the playback mode information representing a playback mode of the audio information per respective one of volume settings in the extended distribution information; and a transmission unit, in response to receiving the request from the recipient's apparatus via the network, transmitting the requested basic distribution information and the corresponding extended distribution information generated by the setting unit via the network, wherein each of the recipient's apparatus and the distributor's apparatus comprises a processor executing a program stored in a memory to implement at least a part of function of at least one of the units.

2. The system according to claim 1, wherein the recipient's apparatus further comprises:

a request transmission unit transmitting a request of a content file on the basis of the basic distribution information displayed by the output control unit; and a download unit downloading the content file from the distributor's apparatus via the network.

3. The system according to claim 1, wherein the recipient's apparatus further comprises:

a selection unit selecting one of content files in a list contained in the basic distribution information displayed output control unit in response to a recipient's manual operation or automatically;

a request transmission unit transmitting a request of the content file selected by the selection unit to the distributor's apparatus via the network; and a download unit downloading the content file from the distributor's apparatus, wherein the selection unit switches between manual selection of the content file by the recipient's manual operation and automatic selection of the content file in accordance with the display form of the window of the predetermined program.

4. The system of claim 1, wherein detecting the state of volume setting comprises determining whether the volume is set to mute.

5. A method for use in an information processing system including a distributor's apparatus and a recipient's apparatus on a network, wherein the method comprises the steps, executed by the recipient's apparatus, of:

displaying a window of the predetermined program on a display unit using one of a plurality of display forms, when a predetermined program is activated;

automatically requesting the distributor's apparatus to transmit basic distribution information, when the predetermined program is being activated;

receiving the requested basic distribution information, extended distribution information that corresponds to the requested basic distribution information, and audio information from a distributor's apparatus via the network, the extended distribution information including a display arrangement pattern of the basic distribution information per respective one of the plurality of display forms of the window of the predetermined program and playback mode information representing a playback mode of the audio information per respective one of volume settings and the detected state of volume setting;

detecting the display form of the window of the predetermined program displayed in the displaying step and a state of volume setting, when the basic distribution information to be displayed on the display unit is received by the receiving step;

displaying the basic distribution information on the display unit using the display arrangement pattern that is determined based on the extended distribution information and the detected display form; and playing back the audio information based on the extended distribution information, and the method comprises the steps, executed by the distributor's apparatus, of:

setting the display arrangement pattern of the basic distribution information per respective one of the plurality of display forms of the window of the predetermined program and the playback mode information representing a playback mode of the audio information per respective one of volume settings in the extended distribution information; and in response to receiving the request from the recipient's apparatus via the network, transmitting the requested basic distribution information and the corresponding extended distribution information generated in the setting step via the network.

* * * * *